(12) United States Patent
Sugiyama

(10) Patent No.: US 9,955,046 B1
(45) Date of Patent: Apr. 24, 2018

(54) METHOD FOR CONTROLLING SETTING SCREEN TO ENABLE SELECTION BETWEEN FIRST MODE FOR FORMING IMAGE USING COLOR MATERIAL FOR NON-REMOVAL AND SECOND MODE FOR FORMING IMAGE USING COLOR MATERIAL FOR REMOVAL

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Hiroyuki Sugiyama, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/653,654

(22) Filed: Jul. 19, 2017

Related U.S. Application Data

(63) Continuation-in-part of application No. 15/333,237, filed on Oct. 25, 2016.

(51) Int. Cl.
*G03G 15/00* (2006.01)
*H04N 1/60* (2006.01)
*H04N 1/32* (2006.01)

(52) U.S. Cl.
CPC ....... *H04N 1/6069* (2013.01); *G03G 15/5016* (2013.01); *G03G 15/6585* (2013.01); *H04N 1/32309* (2013.01); *G06T 2207/10141* (2013.01)

(58) Field of Classification Search
CPC ............... G03G 15/50; G03G 15/6585; G03G 15/5016; H04N 1/6069; H04N 1/32309; H04N 1/00408; H04N 1/00411; G06T 2207/10141
See application file for complete search history.

(56) References Cited

U.S. PATENT DOCUMENTS

| | | | |
|---|---|---|---|
| 9,104,154 B2 | 8/2015 | Fujiwara | |
| 9,527,329 B1 | 12/2016 | Takeishi | |
| 2011/0310422 A1* | 12/2011 | Hagiwara | .......... G03G 15/5016 358/1.13 |
| 2016/0103644 A1* | 4/2016 | Saito | ................. H04N 1/00411 358/1.15 |
| 2016/0229164 A1 | 8/2016 | Taki | |

OTHER PUBLICATIONS

Non-Final Office Action for U.S. Appl. No. 15/333,237 dated Jul. 12, 2017.

* cited by examiner

*Primary Examiner* — Sophia S Chen
(74) *Attorney, Agent, or Firm* — Amin, Turocy & Watson LLP

(57) ABSTRACT

In general, a control method of an embodiment is to control a setting screen which enables selection between a first mode for forming an image using a color material for non-removal and a second mode for forming an image using a color material for removal. When the first mode is set, the control method enables, on a setting screen, the setting of a punching post-processing for making a hole in an image receiving medium and a non-punching post-processing for making no hole in the image receiving medium, and when the second mode is set, on the setting screen, disables the setting of the punching post-processing, but enables the setting of the non-punching post-processing.

10 Claims, 21 Drawing Sheets

METHOD FOR CONTROLLING SETTING SCREEN TO ENABLE SELECTION BETWEEN FIRST MODE FOR FORMING IMAGE USING COLOR MATERIAL FOR NON-REMOVAL AND SECOND MODE FOR FORMING IMAGE USING COLOR MATERIAL FOR REMOVAL

CROSS-REFERENCE TO RELATED APPLICATIONS

This application is a Continuation-in-Part of application Ser. No. 15/333,237 filed Oct. 25, 2016, the entire contents of which are incorporated herein by reference.

FIELD

Embodiments described herein relate generally to a technique for controlling a print setting screen.

BACKGROUND

Conventionally, there is an image forming apparatus that can carry out any one of a non-decoloring printing using a color material for non-removal (permanent printing) and a decoloring printing using a decolorable color material. Through heating an image receiving medium to which the decoloring printing is carried out, an image can be decolored, and the image receiving medium can be reused.

There is an image forming apparatus that can execute a stapling processing. It is necessary to pull out a staple from the image receiving medium before the decoloring processing of the image receiving medium so as to reuse the image receiving medium to which the image forming apparatus carries out the stapling processing at the time of the decoloring printing. However, if the staple is pulled out from the image receiving medium, there is a problem that holes are left on the image receiving medium.

DETAILED DESCRIPTION

Figure 1:
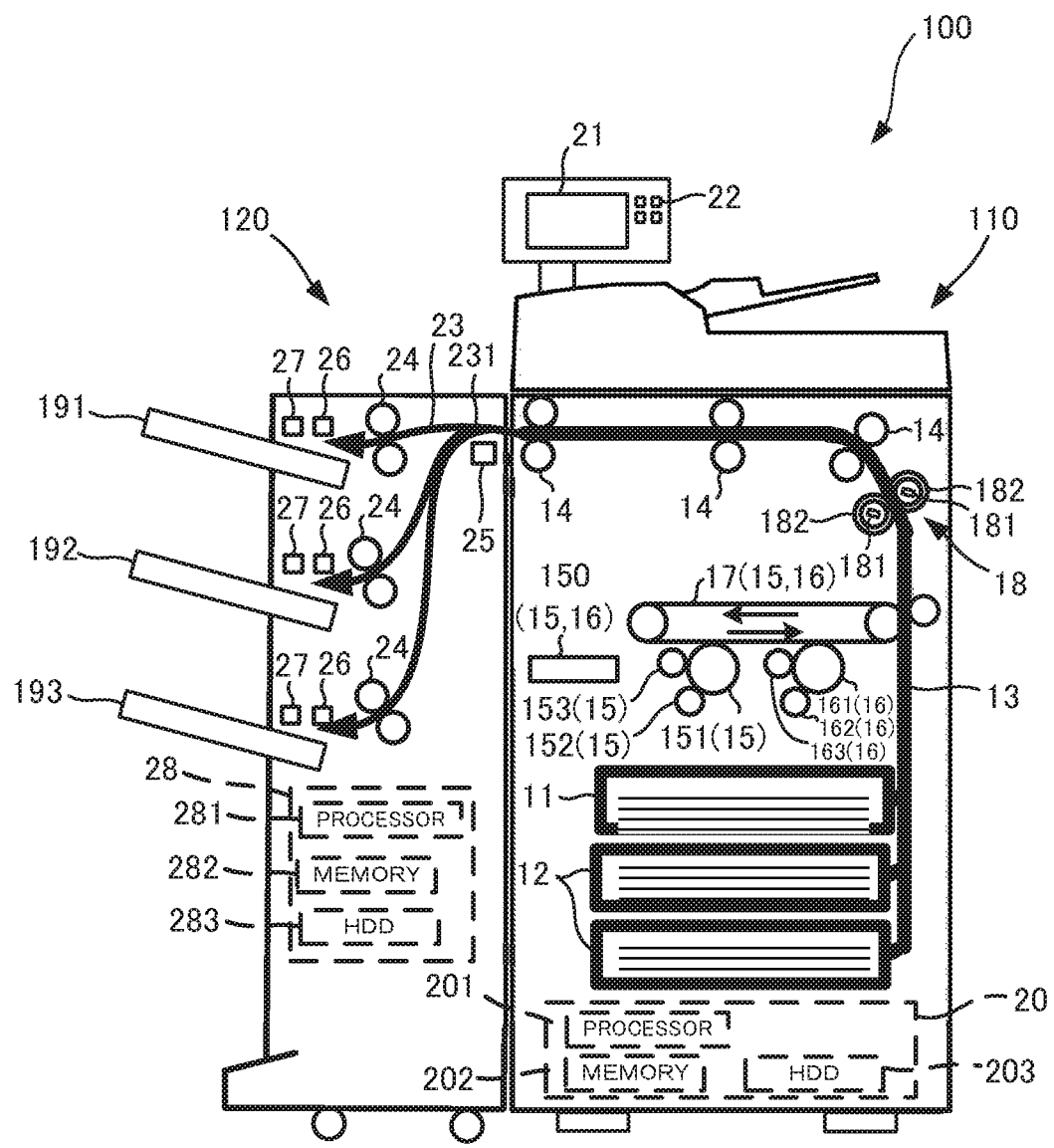
FIG. 1 is a diagram illustrating the configuration of an image forming apparatus 100.

In general, a control method of an embodiment is to control a setting screen which enables selection between a first mode for forming an image using a color material for non-removal and a second mode for forming an image using a color material for removal. In the control method, when the first mode is set, the setting screen enables setting of a punching post-processing for punching an image receiving medium and a non-punching post-processing for not punching an image receiving medium; and when the second mode is set, the setting screen disables setting of the punching post-processing and enables setting of the non-punching post-processing.

Generally, in accordance with an embodiment, an image forming apparatus comprises a first image forming section, a second image forming section, a first processing section, a second processing section and a controller. The first image forming section uses a color material for non-removal to permanently form an image on an image receiving medium. The second image forming section uses a color material for removal to temporarily form an image on an image receiving medium. The first processing section carries out a first processing for making a hole in the image receiving medium on which the first image forming section or the second image forming section forms an image. The second processing section carries out a second processing which does not make a hole in the image receiving medium on which the first image forming section or the second image forming section forms an image. The controller carries out the second processing without carrying out the first processing to the image receiving medium on which the image is formed with the color material for removal at the time of executing a job in a case in which the job contains formation of the image with the color material for removal and carries out the first processing.

Generally, in accordance with another embodiment, a method for executing a job is carried out by an image forming apparatus that can carry out formation of an image on an image receiving medium using a color material for non-removal and formation of an image on an image receiving medium using a color material for removal, and also can carry out a first processing for making a hole and a second processing that does not make a hole in the image receiving medium on which the image is formed. The method involves executing the second processing without carrying out the first processing to the image receiving medium on which the image is formed with the color material for removal at the time of executing the job in a case in which the job contains formation of the image with the color material for removal and carries out the first processing.

Generally, in accordance with an embodiment, a processing apparatus of a job carries out a processing to an image receiving medium on which an image forming apparatus that can carry out formation of an image on an image receiving medium using a color material for non-removal and formation of an image on an image receiving medium using a color material for removal forms an image. The processing apparatus comprises a first processing section, a second processing section and a controller. The first processing section carries out a first processing for making a hole in the image receiving medium to the image receiving medium on which the image forming apparatus forms an image. The second processing section carries out a second processing which does not make a hole in the image receiving medium to the image receiving medium on which the image forming apparatus forms an image. The controller carries out the second processing without carrying out the first processing to the image receiving medium on which the image forming apparatus forms an image at the time of executing a job by the image forming apparatus and the processing apparatus in a case in which the job executed by the image forming apparatus contains formation of the image with the color material for removal and carries out the first processing.

Hereinafter, embodiments are described with reference to the accompanying drawings.

First Embodiment

FIG. 1 is a diagram illustrating the configuration of an image forming apparatus 100.

The image forming apparatus 100 is equipped with an apparatus main body 110 and a finisher 120 (processing apparatus such as a post processing apparatus).

The apparatus main body 110 can execute a print job for non-removal, a print job for removal and a removal job.

The print job for non-removal refers to a job of permanently forming an image on an image receiving medium with a color material for non-removal. In the present embodiment, as toner is used as the color material for non-removal, the print job for non-removal contains a fixing processing for fixing the image on the image receiving medium by heating the image receiving medium in addition to a printing processing.

The print job for removal refers to a job of forming an image on an image receiving medium with color material for removal. In the present embodiment, as toner is used as the color material for removal, the print job for removal contains a fixing processing for fixing the image on the image receiving medium by heating the image receiving medium in addition to a printing processing.

The removal job refers to a job of removing the image on the image receiving medium which is formed with the color material for removal. In the present embodiment, in the removal job, through heating the image receiving medium with a heat source 18, the image on the image receiving medium is decolored. The removal job may be a job of decoloring the image on the image receiving medium through heating the image receiving medium, irradiating the image receiving medium with light, or a job of removing the color material on the image receiving medium from the image receiving medium through a blade or some other physical contact or chemical means.

The color material for removal is, for example, a decoloring toner, and contains a coloring compound, developer and a decoloring agent in addition to resin. For example, a leuco dye which develops blue is exemplified as the coloring compound. For example, a phenol type is exemplified as the developer. A matter that is miscible with the coloring compound if heated and has no affinity for the developer is exemplified as the decoloring agent. The decolorable color material develops color through the interaction between the coloring compound and the developer and is decolored as the interaction between the coloring compound and the developer is cut off through the heating at a temperature equal to or greater than a decoloring temperature. The color material for removal may be ink that is decolored through being heated or irradiated with the light. The color material for removal may be toner or ink suitable to be removed through a blade from the image receiving medium. Note that the color of the decoloring toner is, for example, blue.

The decoloring (removal of an image) refers to making an image formed with a color (containing not only chromatic colors but also achromatic colors such as white, black and the like) different from a base color of the image receiving material invisible visually or difficult to be visually seen. The invisible visually refers to making the image formed with the color different from the base color of the image receiving material change to a color identical or similar to the base color of the image receiving material in addition to a form in which the image formed with the color different from the base color of the image receiving material is colorless (transparent).

The color material for non-removal is an ordinary color material not for the purpose of removing, and is, for example, a toner not including the developer and the decoloring agent. The color material for non-removal contains carbon as the color developing agent in addition to the resin.

The apparatus main body 110 can also execute a copy job. The apparatus main body 110 uses document data read as image data to generate the copy job. The copy job is also executed by using the color material for non-removal and the color material for removal. Hereinafter, the print job for non-removal can also be referred to as a copy job for non-removal for forming the image on the image receiving medium with the color material for non-removal. The print job for removal can also be referred to as a copy job for removal for forming the image on the image receiving medium with the color material for removal.

The image receiving medium is a paper, an envelope, a transparency and the like.

The apparatus main body 110 is equipped with paper feed cassettes 11 and 12, a conveyance path 13, a conveyance roller 14, a first image forming section 15, a second image forming section 16, a heat source 18, a controller 20, a display 21 and an operation section 22.

The paper feed cassette 11 stacks the image receiving media used in the print job for non-removal and the print job for removal.

The paper feed cassette 12 stacks the image receiving media, used in the removal job, on which an image is formed with the color material for removal.

The conveyance path 13 is a path of the image receiving medium from the paper feed cassettes 11 and 12 to the finisher 120 and guides the image receiving medium towards the downstream side.

The conveyance roller 14 is positioned at a proper position in the conveyance path 13 to send the image receiving medium to the downstream side.

The first image forming section 15 forms an image on the image receiving medium with the color material for non-removal. The first image forming section 15 forms an image only with the color material for non-removal entirely in black; however, the first image forming section 15 may also form the image with the color material for non-removal of a plurality of colors. The first image forming section 15 has components required for image formation such as an exposure section 150, a first photoconductor 151, a charging charger 152, a developing device 153 and the like. The charging charger 152 charges the first photoconductor 151. The exposure section 150 exposes the first photoconductor 151 through the laser to form an electrostatic latent image on the first photoconductor 151. The developing device 153 develops the electrostatic latent image on the first photoconductor 151 with the color material for non-removal to form a toner image on the first photoconductor 151. The first photoconductor 151 transfers the toner image onto a transfer belt 17. The transfer belt 17 transfers the toner image onto the image receiving medium.

The second image forming section 16 has components required for image formation such as an exposure section 150, a second photoconductor 161, a charging charger 162, a developing device 163 and the like. The charging charger 162 charges the second photoconductor 161. The exposure section 150 exposes the second photoconductor 161 through the laser to form an electrostatic latent image on the second photoconductor 161. The developing device 163 develops the electrostatic latent image on the second photoconductor 161 with the color material for removal to form a toner image on the second photoconductor 161. The second photoconductor 161 transfers the toner image onto the transfer belt 17. The transfer belt 17 transfers the toner image onto the image receiving medium.

The first image forming section 15 and the second image forming section 16 may form images independently. The second image forming section 16 may overlay an image formed with the color material for removal on the image formed with the color material for non-removal by the first image forming section 15 to form one image.

The first image forming section 15 forms the image only with the color material for non-removal in black color; however, the first image forming section 15 may also form the image by using the color material for non-removal in a plurality of colors. The second image forming section 16 forms the image only with the color material for removal in blue color; however, the second image forming section 16 may also form the image by using the color material for removal in a plurality of colors. The exposure section 150 and the transfer belt 17 serve as components of the second image forming section 16 and the first image forming section 15. The second photoconductor 161 is positioned at the downstream side (transfer position side at an end point) of the first photoconductor 151 if the position where the image is transferred from the transfer belt 17 onto the image receiving medium is taken as the end point in the rotation direction of the transfer belt 17. The second photoconductor 161 may be positioned at the upstream side of the first photoconductor 151.

The heat source 18 is equipped with a heater 181 and a heat roller 182.

The heater 181 is positioned in the heat roller 182 and heats the heat roller 182.

A pair of the heat rollers 182 contacts with each surface of the image receiving medium. The heat roller 182 includes a function of heating the image receiving medium on which the first and the second image forming sections 15 and 16 form images to fix the images on the image receiving medium and a function of heating the image receiving medium on which an image is formed with the color material for removal to decolor the image.

The controller 20 is equipped with a processor 201, a memory 202 and an HDD 203 (Hard Disk Drive), and controls the whole of the image forming apparatus 100. The controller 20 controls the finisher 120 via a controller 28 of the finisher 120 with respect to the finisher 120. The processor 201 executes programs stored in the memory 202 and the HDD 203 to realize various functions of the image forming apparatus 100.

The display 21 displays setting information and an operation status of the image forming apparatus 100, log information and notification to a user.

The operation section 22 includes buttons and keys to receive an input by the user.

The finisher 120 carries out the post processing to the image receiving medium on which the apparatus main body 110 forms the image. The finisher 120 is equipped with paper discharge trays 191~193, a conveyance path 23, a conveyance roller 24, a puncher (first processing section), a stapler 26 (first processing section), a no damage binding (NDB) unit 27 (second processing section), and the controller 28.

The conveyance path 23 is a path of the image receiving medium from the apparatus main body 110 to the paper discharge trays 191~193, and guides the image receiving medium towards the downstream side.

The conveyance roller 24 is positioned at a proper position of the conveyance path 23, and guides the image receiving medium towards the downstream side.

The finisher 120 discharges the image receiving medium on which the image is formed with the color material for non-removal to the paper discharge tray 191. The finisher 120 discharges the image receiving medium on which the image is formed with the color material for removal to the paper discharge tray 192. The finisher 120 discharges the image receiving medium to which the removing processing is carried out to the paper discharge tray 193.

In the conveyance path 23, a bifurcation 231 is arranged at a position from the apparatus main body 110 towards the downstream. The conveyance path 23 bifurcated by the bifurcation 231 reaches each of the paper discharge trays 191~193. A puncher 25 is arranged at the upstream side of the bifurcation 231.

The puncher 25 makes holes in the image receiving medium. A ring passes through each hole of the bundle of the image receiving media on which the puncher 25 makes holes, and thus, the image receiving medium bundle can be bound.

Figure 2:
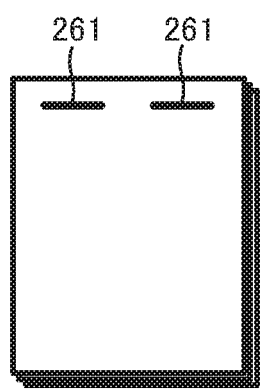
FIG. 2 is a diagram illustrating an image receiving medium bundle bound by staples 261.
Figure 3:
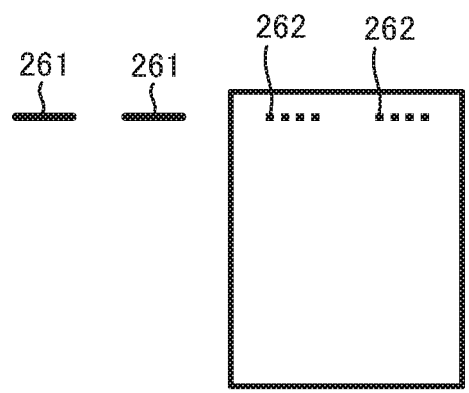
FIG. 3 is a diagram illustrating an image receiving medium bundle from which the staples 261 are detached.

The stapler 26 is arranged corresponding to the paper discharge trays 191~193. The stapler 26 drives the staple 261 into the image receiving medium bundle to bind the image receiving medium bundle as shown in FIG. 2. At the time of reusing the image receiving medium bundle on which the image is formed with the color material for removal and to which the stapling processing is carried out, as shown in FIG. 3, it is necessary to pull out the staple 261 from the image receiving medium bundle. If the staple 261 is pulled out form the image receiving medium bundle, holes 262 caused by the staple 261 are left on the image receiving medium, and the image receiving medium becomes an unfavorable state for reuse.

The first processing section carries out the first processing for making a hole on the image receiving medium to the image receiving medium on which the first and the second image forming sections 15 and 16 form the image. Making a hole involves formation of a notch. The puncher 25 and the stapler 26 are the first processing sections.

Figure 4:
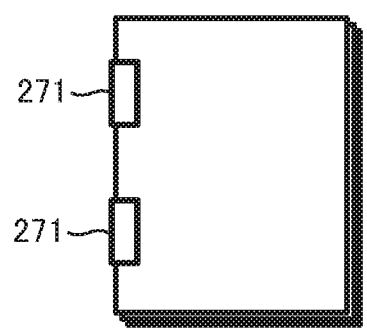
FIG. 4 is a diagram illustrating an image receiving medium bundle bound by clips.

The NDB unit 27 carries out an NDB (No Damage Binding) processing for binding the image receiving medium bundle without making a hole in the image receiving medium bundle. As shown in FIG. 4, the NDB unit 27 creates an image receiving medium bundle so that one edges of each of the image receiving media in the transverse direction are slightly shifted from each other. The NDB unit 27 mounts a detachable U-shape clip 271 at one edge of the transverse direction of the image receiving medium bundle. The adhesive is coated on the inner surface of the clip 271.

Figure 5:
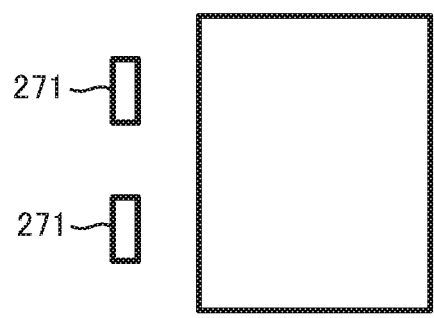
FIG. 5 is a diagram illustrating an image receiving medium bundle from which the clips are detached.

The clip 271 contacts with one edges of all the image receiving media of the image receiving medium bundle to bind the image receiving medium bundle. As the clip 271 only adheres to the image receiving medium, even if the clip 271 is detached from the image receiving medium, the hole is not made on the image receiving medium. Thus, as shown in FIG. 5, if the clip 271 is detached from the image receiving medium, the image receiving medium can be reused.

The second processing section carries out the second processing that does not make a hole in the image receiving medium to the image receiving medium on which the second image forming section 16 forms the image. The NDB unit 27 is the second processing section.

The controller 28 is equipped with a processor 281, a memory 282 and an HDD 283, and controls the finisher 120 under the control of the apparatus main body 110. The processor 281 executes programs stored in the memory 282 and the HDD 283 to realize various functions of the finisher 120.

The controller 20 of the apparatus main body 110 receives setting/non-setting of an automatic NDPP (No Damage Post-Processing) via the operation section 22. The automatic NDPP is to set whether the post-processing is automatically performed. In a case in which the automatic NDPP is set, the controller 20 carries out the following processing in a case in which a job contains formation (print or copy) of the image using the color material for removal and carries out the first processing for making a hole in the image receiving medium. The controller 20 carries out the second processing that does not make a hole in the image receiving medium without carrying out the first processing to the image receiving medium on which the second image forming section 16 forms the image at the time of executing the job.

The controller 20 carries out the first processing without any changes in a case in which the automatic NDPP is not set even if the job contains formation of the image using the color material for removal and carries out the first processing for making a hole in the image receiving medium.

Figure 6:
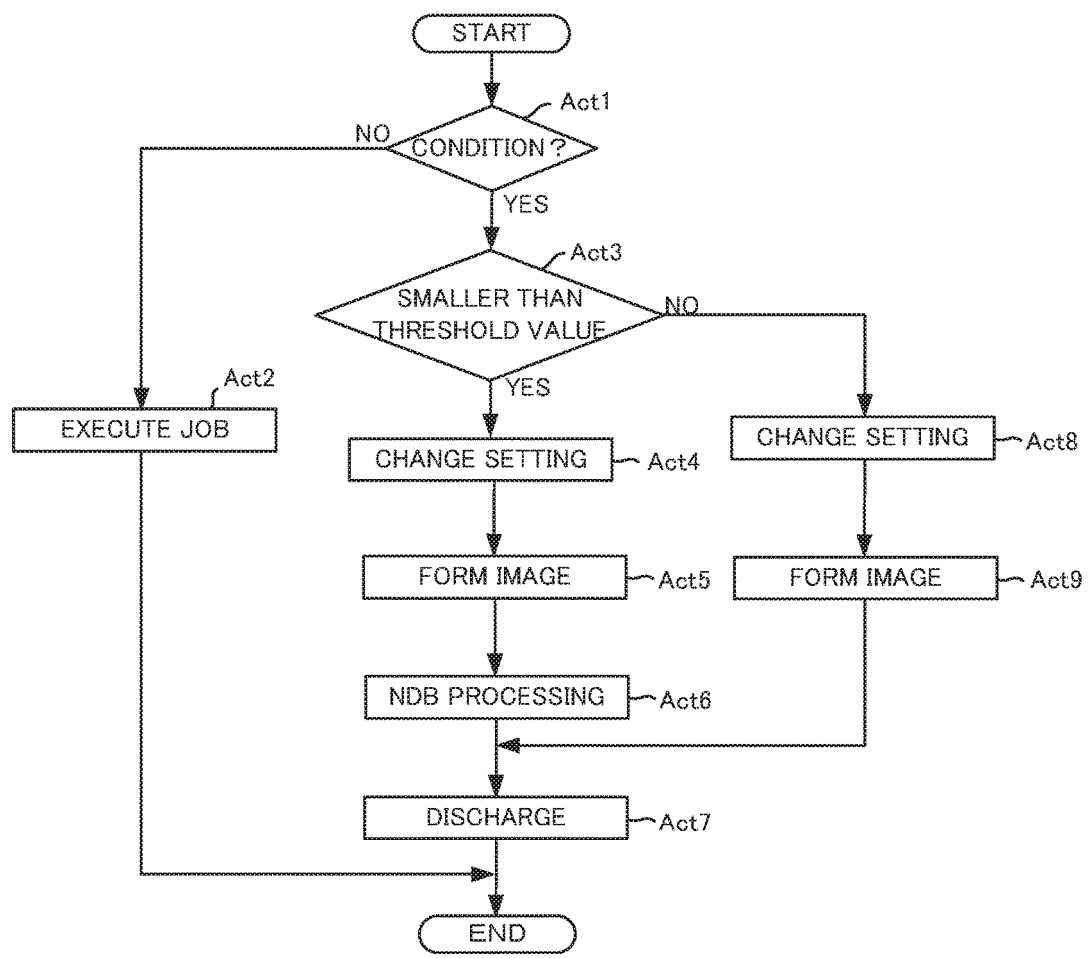
FIG. 6 is a flowchart illustrating a processing of a job by a controller 20.
Figure 7:
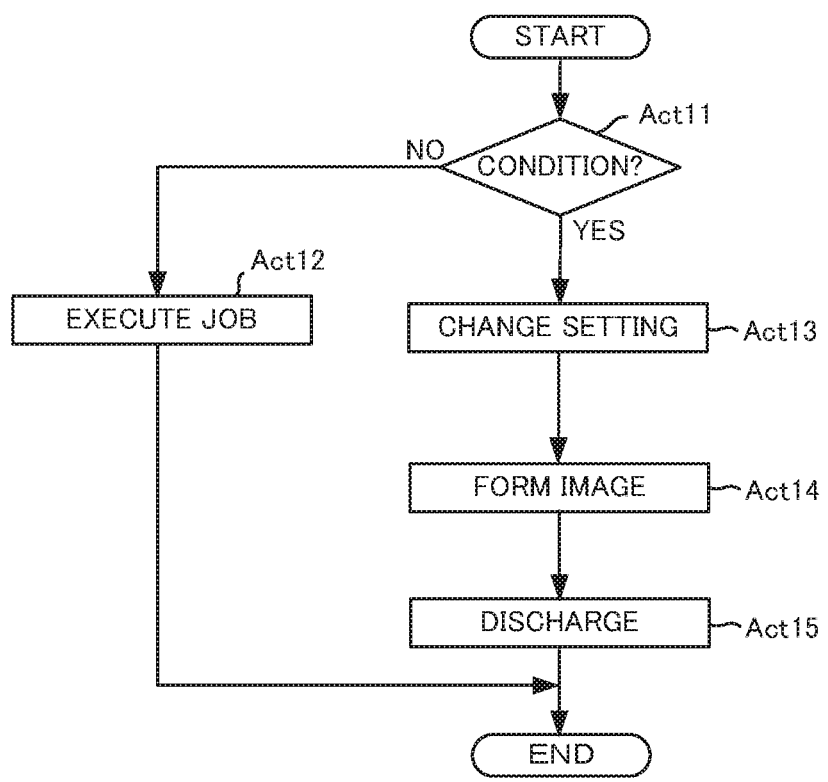
FIG. 7 is a flowchart illustrating a processing of a job by the controller 20.
Figure 8:
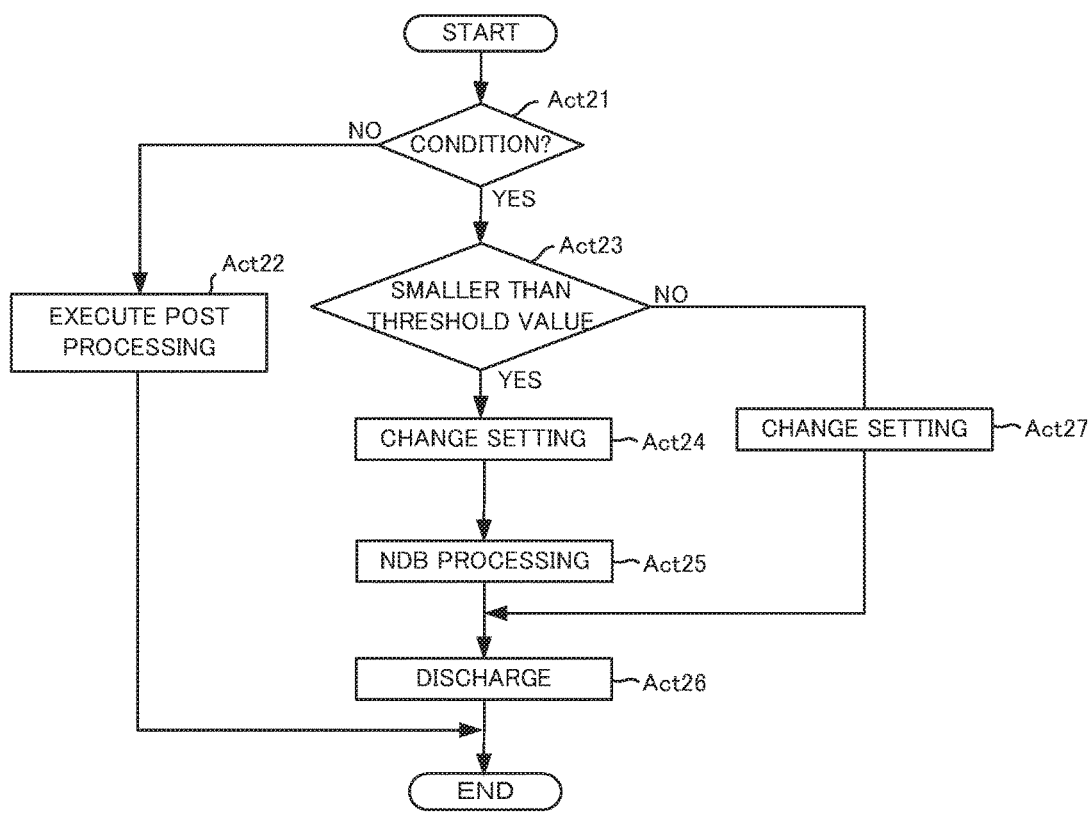
FIG. 8 is a flowchart illustrating a processing by a finisher.

Hereinafter, a specific processing of the job by the controller 20 is described with reference to FIG. 6. Hereinafter, the job executed by the controller 20 is a print job for removal. In FIG. 6 and FIGS. 7 and 8 described later, the apparatus main body 110 and the finisher 120 execute each processing through executing the programs stored in the memories 202 and 282 by the processors 201 and 281.

If the print job for removal does not meet conditions (No in Act 1), the controller 20 executes the job without changing the setting of the print job for removal (Act 2). The conditions refer to that the automatic NDPP is set and that the stapling processing is set as the post processing of the print job for removal. The controller 20 refers to the conditions stored in the memory 202 to determine whether or not the print job for removal meets the conditions (Act 1).

Thus, the controller 20 carries out the stapling processing if the automatic NDPP is not set and if the stapling processing is set in the print job for removal.

If the print job for removal meets the conditions (Yes in Act 1) and the number of processed sheets of the job is smaller than a threshold value (Yes in Act 3), the controller 20 carries out the following processing. The controller 20 switches the stapling processing (first processing) to an NDB processing (second processing) in the setting of the post processing of the print job for removal (Act 4).

The controller 20 executes the job (Acts 5~7). More specifically, the controller 20 sends the image receiving medium to the finisher 120 after the image is formed on the image receiving medium with the color material for removal by the second image forming section 16. The controller 20 carries out the processing corresponding to the number of the processed sheets of the job (Act 5).

The controller 20 controls the finisher 120 to carry out the NDB processing by the NDB unit 27 to the image receiving medium bundle to bind the image receiving medium bundle (Act 6). The control of the finisher 120 contains that the controller 20 controls the finisher 120 to execute the NDB processing, and the notification of the number of processed sheets of the print job for removal and the processing state of the job to the finisher 120. The finisher 120 receives the notification from the controller 20, and carries out the NDB processing to the image receiving medium bundle to bind the image receiving medium bundle.

The controller 20 discharges the image receiving medium bundle to the paper discharge tray 191 (Act 7).

If the print job for removal meets the conditions (Yes in Act 1), and if the number of processed sheets of the job is equal to or greater than the threshold value (No in Act 3), the controller 20 carries out the following processing. The controller 20 does not set the stapling processing (first processing) in the setting of the post processing of the print job for removal (ACT 8).

The controller 20 executes the job (Acts 9, 7). More specifically, the controller 20 sends the image receiving medium to the finisher 120 after the image is formed on the image receiving medium with the color material for removal by the second image forming section 16. The controller 20 carries out the processing corresponding to the number of processed sheets of the job (Act 9).

The controller 20 controls the finisher 120 to discharge each image receiving medium to the paper discharge tray 191 (Act 7). In Acts 9 and 7, the processing by the controller 20 for discharging the image receiving medium on which the image is formed to the paper discharge tray 191 without carrying out the stapling processing is the second processing that does not make a hole in the image receiving medium. In this case, the second processing section that carries out the second processing is a conveyance section containing the conveyance paths 13 and 23 and the conveyance rollers 14 and 24. The conveyance section conveys the image receiving medium on which the first image forming section 15 or the second image forming section 16 forms the image to the paper discharge tray 191.

Second Embodiment

Hereinafter, the processing of the job by the controller 20 is described with reference to FIG. 7. Hereinafter, the job executed by the controller 20 is the print job for removal.

If the print job for removal does not meet conditions (No in Act 11), the controller 20 executes the job without changing the setting of the print job for removal (Act 12). The conditions refer to that the automatic NDPP is set and that a punch processing is set as the post processing of the print job for removal. The controller 20 refers to the conditions stored in the memory 202 to determine whether or not the print job for removal meets the conditions (Act 11).

Thus, the controller 20 carries out the punch processing (first processing) if the automatic NDPP is not set and if the punch processing is set in the print job for removal.

If the print job for removal meets the conditions (Yes in Act 11), the controller 20 does not set the punch processing (first processing) in the setting of the post processing of the print job for removal (Act 13).

The controller 20 executes the job (Acts 14 and 15). More specifically, the controller 20 forms the image on the image receiving medium with the color material for removal (Act 14) and discharges the image receiving medium bundle to the paper discharge tray 191 through the finisher 120 (Act 15). In Acts 14 and 15, the processing by the controller 20 for discharging the image receiving medium on which the image is formed to the paper discharge tray 191 without any changes is the second processing. In this case, the second processing section that carries out the second processing under the control of the controller 20 is a conveyance section containing the conveyance paths 13 and 23 and the conveyance rollers 14 and 24.

Third Embodiment

Hereinafter, the job by the controller 28 of the finisher 120 is described with reference to FIG. 8. Hereinafter, the job executed by the apparatus main body 110 is the print job for removal. The controller 28 of the finisher 120 receives contents of the setting of the post processing of the job executed by the apparatus main body 110 and a processing state of the job from the apparatus main body 110.

If the print job for removal executed by the apparatus main body 110 does not meet conditions (No in Act 21), the controller 28 executes the post processing (first processing) of the job without changing the setting of the post processing of the print job for removal (Act 22). The conditions refer to that the automatic NDPP is set and that the stapling processing is set as the post processing of the print job for removal. The controller 28 refers to the conditions stored in the memory 282 to determine whether or not the print job for removal meets the conditions (Act 21).

If the print job for removal executed by the apparatus main body 110 meets the conditions (Yes in Act 21) and the number of processed sheets of the job is smaller than a threshold value (Yes in Act 23), the controller 28 carries out the following processing. The controller 28 switches the stapling processing (first processing) to the NDB processing (second processing) in the setting of the post processing executed by the finisher 120 serving as the setting of the post processing of the print job for removal executed by the apparatus main body 110 (Act 24).

The controller 28 carries out the NDB processing to the image receiving medium bundle conveyed from the apparatus main body 110 (Act 25). The controller 28 discharges the image receiving medium bundle to the paper discharge tray 191 (Act 26).

If the print job for removal executed by the apparatus main body 110 meets the conditions (Yes in Act 21), and if the number of processed sheets of the job is equal to or greater than the threshold value (No in Act 23), the controller 28 does not set the stapling processing (first processing) in the setting of the post processing (ACT 27).

The controller 28 discharges the image receiving medium conveyed from the apparatus main body 110 to the paper discharge tray 191 (Act 26). In Act 26, the processing by the controller 28 for discharging the image receiving medium conveyed from the apparatus main body 110 to the paper discharge tray 191 without any changes is the second processing. In this case, the second processing section that carries out the second processing under the control of the controller 28 is a conveyance section containing the conveyance path 23 and the conveyance roller 24. The conveyance section conveys the image receiving medium conveyed from the apparatus main body 110 to the paper discharge tray 191.

Fourth Embodiment

The setting made in the first to third embodiments is such that an operation error causes the print job for removal to make a hole on the image receiving medium. In this case, the image forming apparatus 100 changes the setting of the print job for removal so as not to make a hole on the image receiving medium.

In this embodiment, control is provided on the print setting screen so as to prevent such a setting as being unsuitable for reuse from being input due to an operation error on the print setting screen.

Figure 9:
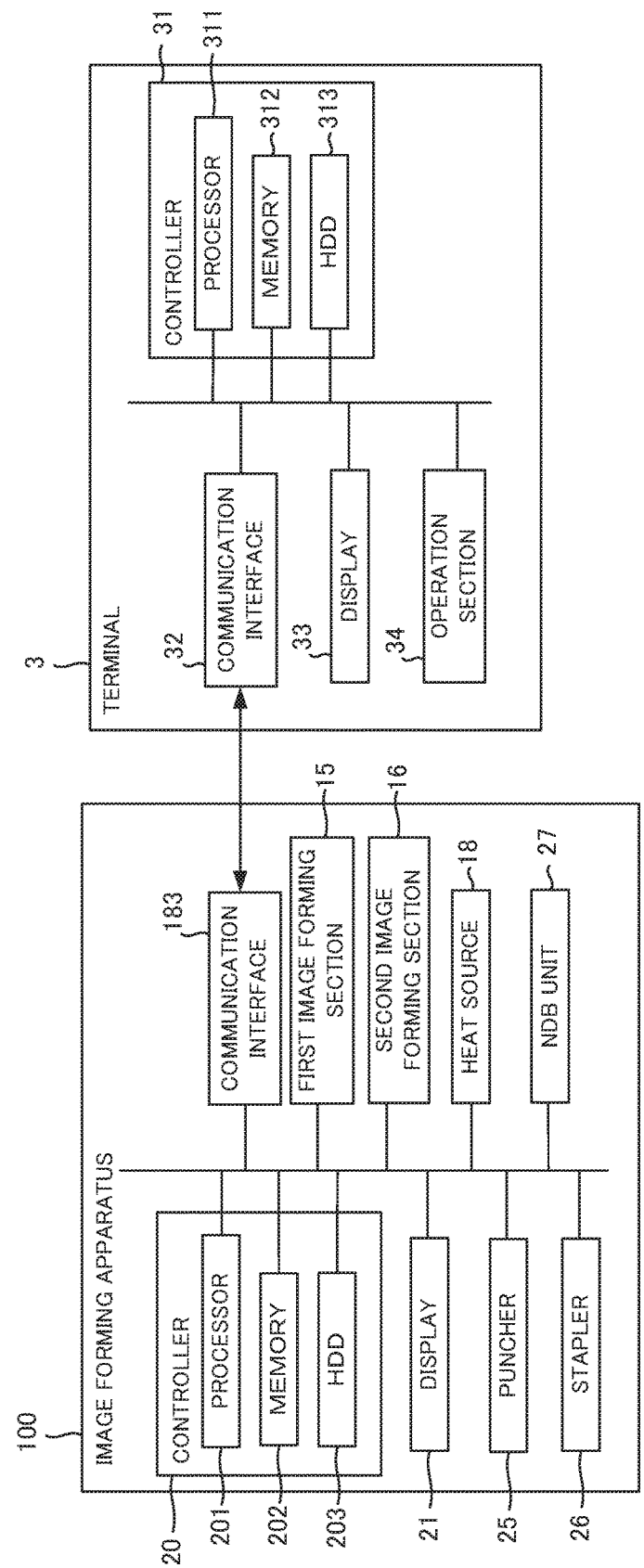
FIG. 9 is a block diagram of an image forming apparatus and a block diagram of a terminal.

FIG. 9 is a block diagram illustrating the image forming apparatus 100 and a block diagram illustrating the terminal 3.

The image forming apparatus 100 and the terminal 3 are connected to each other through the respective communication interfaces 183 and 32. The image forming apparatus 100 has the same hardware configuration as that of the first embodiment. The communication interface 183 is to allow the image forming apparatus 100 to communicate with the external terminal 3 by wire or wirelessly. The image forming apparatus 100 is capable of executing a print job received from the terminal 3.

The image forming apparatus 100 is a Multi-Function Peripheral (MFP) which is capable of executing a plurality of functions such as print, copy, scanner, and FAX. The image forming apparatus 100 includes a scanner, which is capable of reading an image on an image receiving medium. The image forming apparatus 100 is capable of sending the read image data to an external terminal by FAX or Email. The image forming apparatus 100 is capable of forming an image on a sheet on the basis of the read image data.

The terminal 3 is, for example, a Personal Computer (PC). The terminal 3 includes a controller 31, a communication interface 32, a display 33, and an operation section 34. The controller 31 includes a processor 311, a memory 312, and a HDD 313. The operation section 34, such as a keyboard, a mouse, or a touch panel, receives an operation by the operator.

The terminal 3 displays a print setting screen 9 (see FIG. 12) corresponding to the image forming apparatus 100 and receives the setting of printing. The terminal 3 is capable of creating a print job on the basis of the print setting and sending the same to the image forming apparatus 100.

Figure 10:
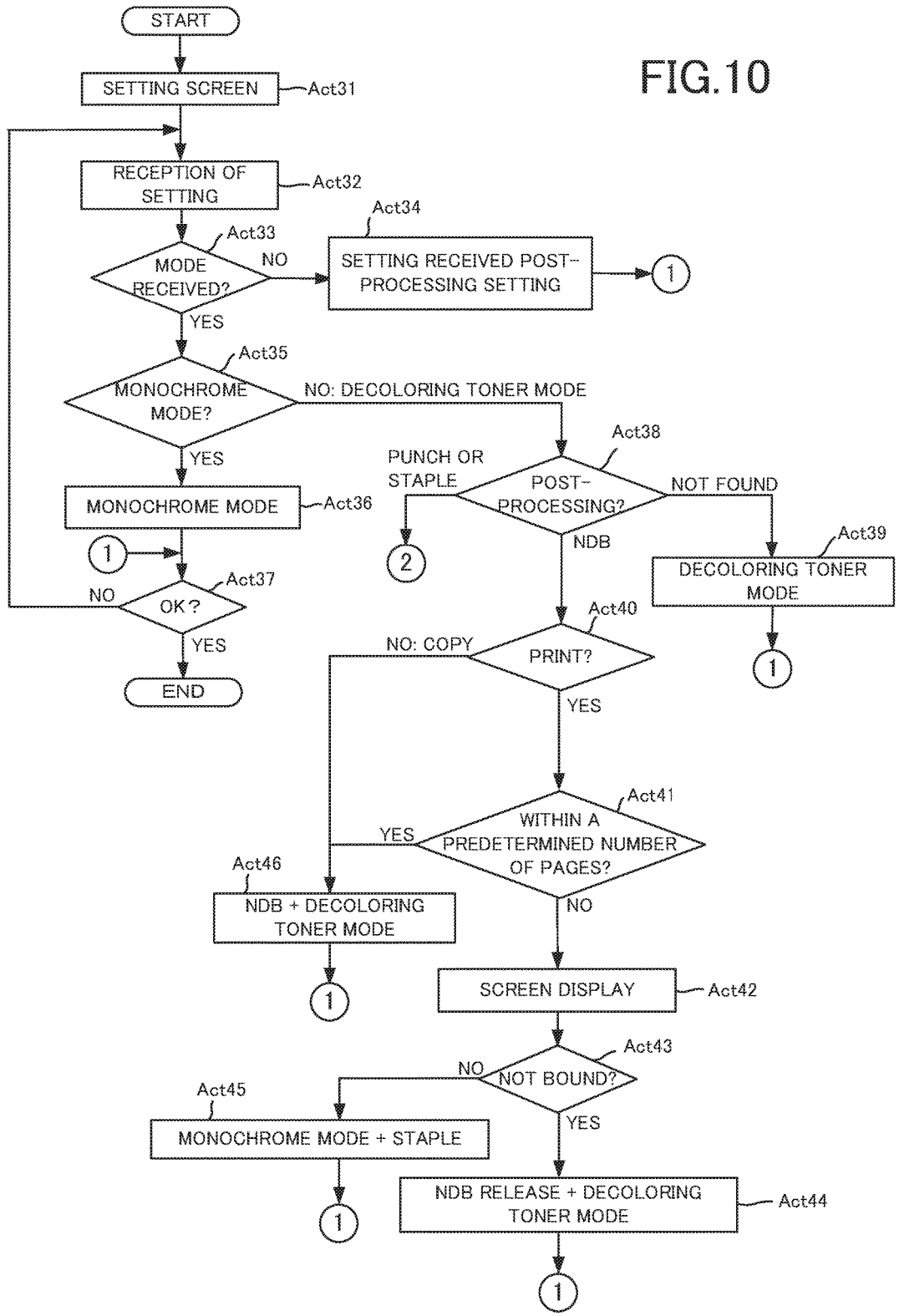
FIG. 10 is a flowchart showing a control processing for a print setting screen.
Figure 11:
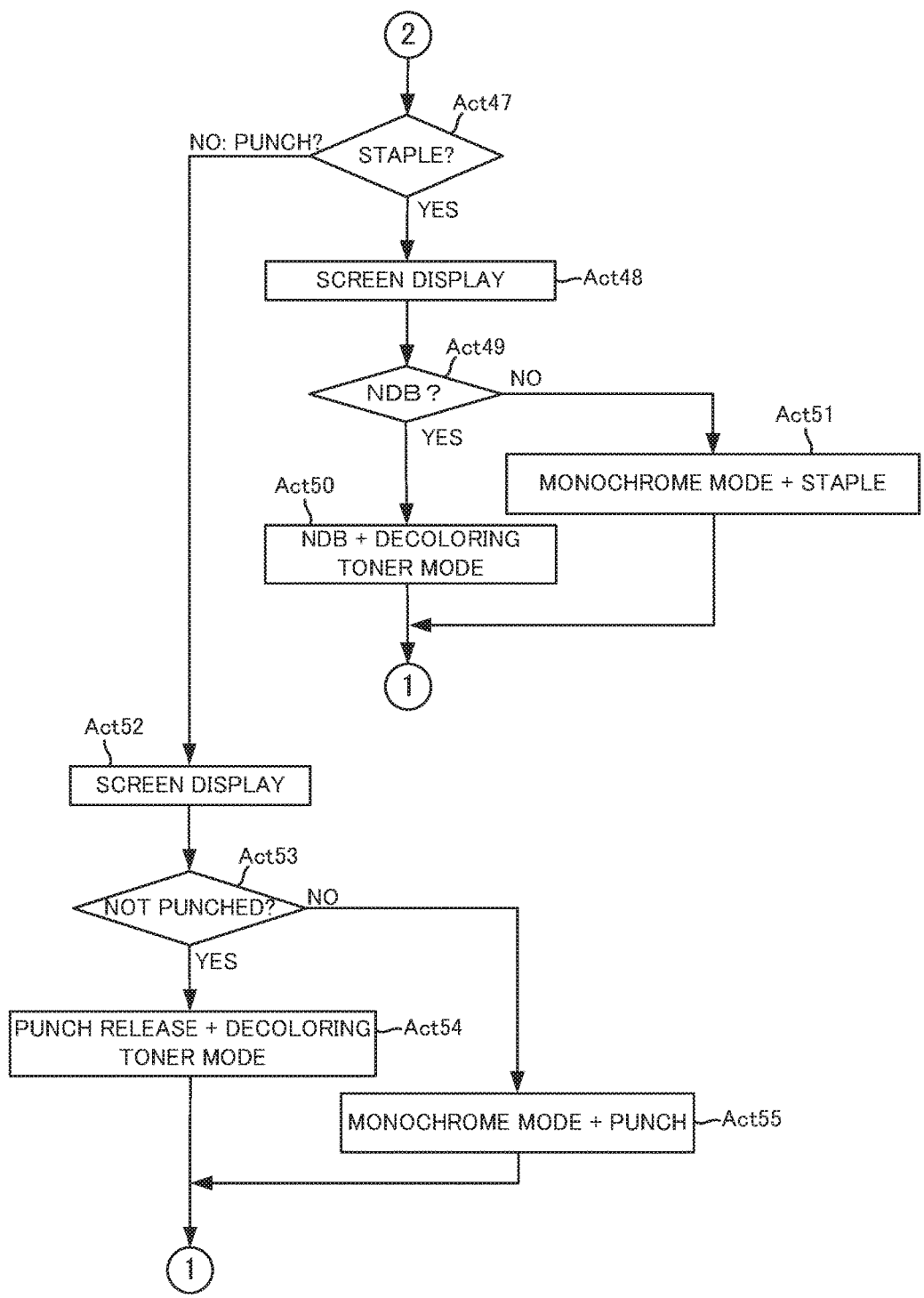
FIG. 11 is a flowchart showing a control processing for a print setting screen.

With reference to the flowcharts of FIG. 10 and FIG. 11, a description will next be given of the processing for controlling the print setting screen 9. The control processing is performed by the processor 311 executing a program, such as a printer driver, which is stored in the memory 312.

Figure 12:
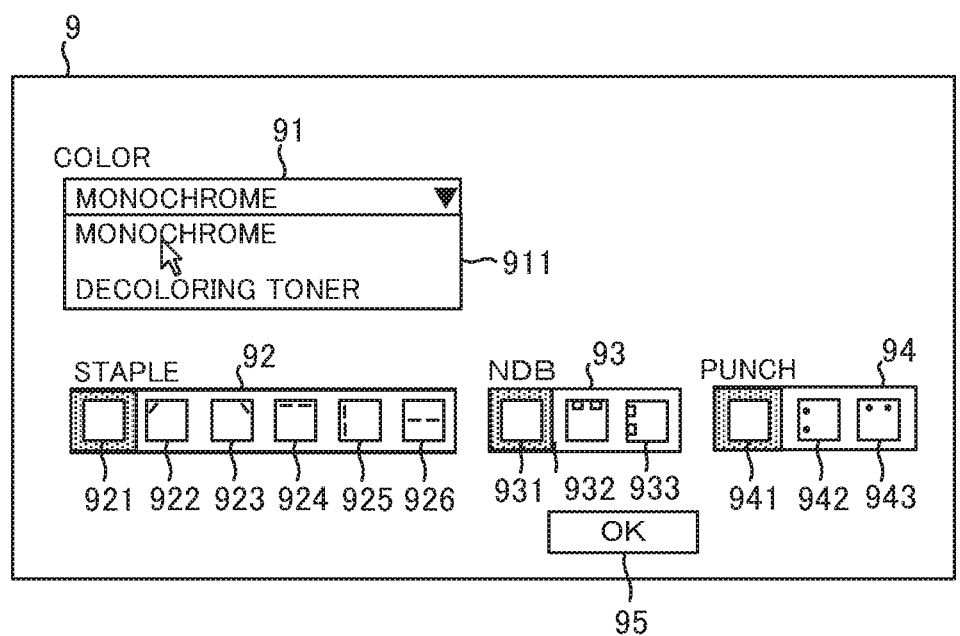
FIG. 12 is a view illustrating a print setting screen.

FIG. 12 is a view illustrating the print setting screen 9.

The terminal 3 (the processor 311) reads a printer driver unique to the image forming apparatus 100 from the memory 312, and then displays the print setting screen 9 on the display 33 (Act 31). Hereafter, the print setting screen 9 may be abbreviated as the setting screen 9.

The setting screen 9 includes an image color setting column 91, a stapling processing setting column 92, an NDB processing setting column 93, a punch processing setting column 94, and an OK button 95.

When the color setting column 91 is selected by the operator, the terminal 3 displays a pull-down list 911. Displayed in the pull-down list 911 are "Monochrome" and "Decoloring toner."

"Monochrome" is indicative of a monochrome mode (the first mode) for forming an image using a black color material for non-removal. "Decoloring toner" is indicative of a decoloring toner mode (the second mode) for forming an image using a blue color material for removal.

The terminal 3 provides the pull-down list 911 to receive a choice between the monochrome mode and the decoloring toner mode.

The default is the monochrome mode.

Displayed in the stapling processing setting column 92 are icons 921 to 926. The icon 921 is indicative of not performing the stapling processing. When the icon 921 is selected, the terminal 3 does not set the stapling processing. The icons 922 to 926 are indicative of the position of the stapling processing on the image receiving medium. When the icons 922 to 926 are selected, the terminal 3 sets the position of the stapling processing to the position shown by the icons 922 to 926.

Displayed in the NDB processing setting column 93 are icons 931 to 933. The icon 931 is indicative of not performing the NDB processing. When the icon 931 is selected, the terminal 3 does not set the NDB processing. The icons 932 and 933 are indicative of the position of the NDB processing on the image receiving medium. When the icons 932 and 933 are selected, the terminal 3 sets the position of the NDB processing to the position shown by the icons 932 and 933.

Displayed in the punch processing setting column 94 are icons 941 to 943. The icon 941 is indicative of not performing the punch processing. When the icon 941 is selected, the terminal 3 does not set the punch processing. The icons 942 and 943 are indicative of the position of the punch processing on the image receiving medium. When the icons 942 and 943 are selected, the terminal 3 sets the position of the punch processing to the position shown by the icons 942 and 943.

By default, none of the stapling processing, the NDB processing, and the punch processing, which are post-processings, is set. Thus, as shown in FIG. 12, the setting screen 9 shows that the icons 921, 931, and 941 have been selected by default.

Note that of the post-processings, the stapling processing and the punch processing are a punching post-processing for making a hole on the image receiving medium. The stapling processing refers to a processing for binding a number of image receiving media using a staple. The punch processing refers to a processing for punching an image receiving medium to make a hole on the image receiving medium.

On the setting screen 9, the terminal 3 receives a choice, for example, of a staple icon 922, thereby receiving the setting of a post-processing (Act 32).

The terminal 3 determines whether to receive the setting of a color mode or whether to receive the post-processing setting (Act 33).

When the post-processing setting is received (Act 33: NO), the terminal 3 sets the received post-processing setting (Act 34).

In this embodiment, as will be discussed later, when the choice of a color mode is received, the setting of post-processings that can be received is restricted depending on the color mode to be received. Furthermore, the terminal 3 may display a warning window depending on the post-processing setting when the choice of the color mode is received.

However, when receiving the post-processing setting (Act 33: NO), the terminal 3 sets the post-processing setting with no change made thereto (Act 34), without restricting the choice of a color mode or displaying the warning window.

When receiving the OK button 95 (Act 37: YES), the terminal 3 exits the control processing on the setting screen 9. The terminal 3 creates a print job on the basis of the color setting and the post-processing setting, and then transmits the print job to the image forming apparatus 100.

When receiving the setting of another item (Act 37: NO), the terminal 3 performs the processing of Act 32.

In Act 32, when receiving the choice of the monochrome mode on the color setting column 91 (Act 33: YES, Act 35: YES), the terminal 3 sets the monochrome mode (Act 36).

Figure 13:
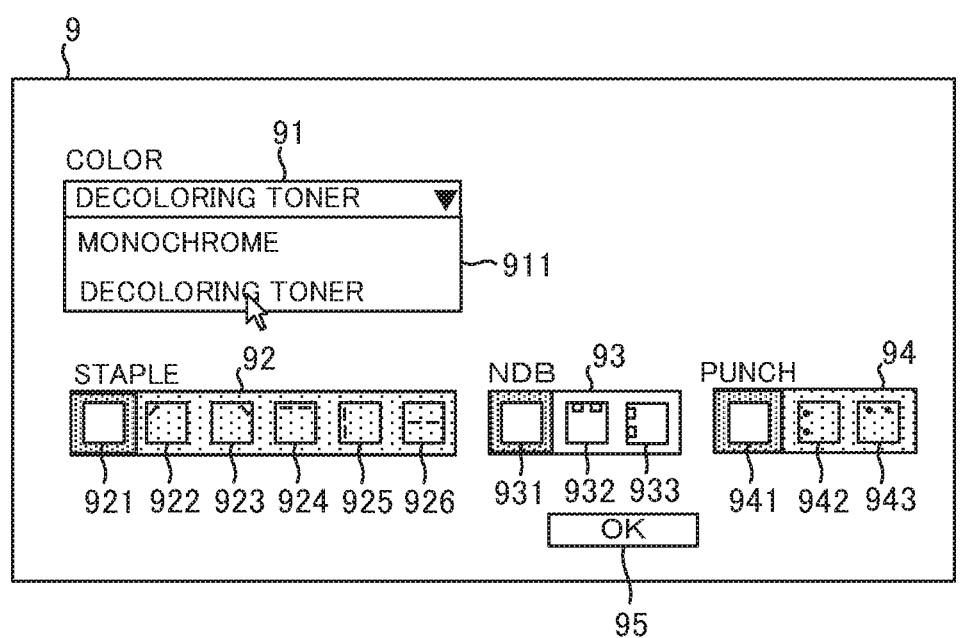
FIG. 13 is a view illustrating a setting screen when a decoloring toner mode is selected.

At this time, the terminal 3 enables receiving any post-processing setting. As shown in FIG. 12, the terminal 3 allows each of the icons 921 to 926, 931 to 933, and 941 to 943 to be selected on the setting columns 92 to 94 for post-processing setting. As will be discussed later, when the decoloring toner mode is set, as shown in FIG. 13, only the NDB processing can be set. When switching the setting from the decoloring toner mode to the monochrome mode, the terminal 3 allows the setting screen 9 to be transitioned to the setting screen 9 of FIG. 12 on which the stapling processing and the punch processing can be set.

Subsequently, a description will be given of the case where the terminal 3 receives a choice of the decoloring toner mode on the color setting column 91 in Act 32 (Act 33: YES, Act 35: NO).

In this case, when the post-processing setting is not set (Act 38: Unavailable), that is, when the icons 921, 931, and 941 have been selected, the terminal 3 sets the decoloring toner mode (Act 39).

At this time, as shown in FIG. 13, at the setting columns 92 and 94 for the stapling processing and the punch processing, the terminal 3 keeps the icons 921 and 941 as selected. Then, the terminal 3 grays out the other icons 922 to 926, 942, and 943 so as not to be selected.

When setting to the decoloring toner mode, the operator intends to reuse the image receiving medium. In this context, the terminal 3 disables the setting (disables the receiving) of the stapling processing for making a hole on the image receiving medium and the punch processing (punching post-processing), and only enables the setting (enables the receiving) of the NDB processing (the non-punching post-processing) for making no hole on the image receiving medium.

Figure 14:
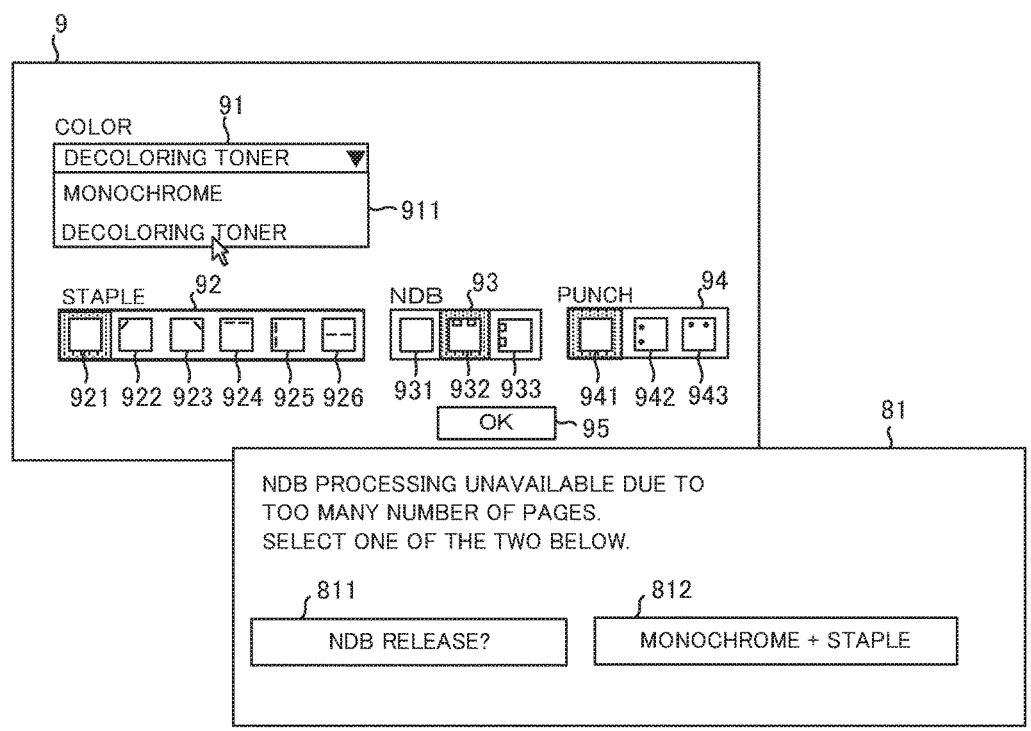
FIG. 14 is a view illustrating a setting screen and a release screen.

FIG. 14 is a view illustrating the setting screen 9 and a release screen 81 (the second release screen).

When the color setting column 91 receives the choice of the decoloring toner mode while the NDB processing is set (Act 38: NDB), the terminal 3 displays the release screen 81 according to the following conditions (Act 42). The conditions are such that the job is a print job (Act 40: YES), and the number of pages of a file to be printed is greater than a predetermined number (Act 41: NO).

Note that when receiving the choice of the decoloring toner mode at the color setting column 91, the terminal 3 indicates the decoloring toner at the setting column 91. Furthermore, on the setting screen 9 of FIG. 14, the icon 932 has been selected because the NDB processing is set.

On the release screen 81, displayed are a button 811 labeled "Release NDB," a button 812 labeled "Monochrome+Staple," and the following sentence: "The NDB processing cannot be performed due to too many pages. Select one of the two below."

When the setting of the NDB processing may be released to maintain the decoloring toner mode, the operator selects the "Release NDB" button 811. In this case, the decoloring toner mode is maintained, and the setting of the NDB processing is released.

When the decoloring toner mode may be released because the binding processing is desired, the operator selects the "Monochrome+Staple" button 812. In this case, the mode is changed to the monochrome mode, and the post-processing setting is changed from the NDB processing to the stapling processing.

Figure 15:
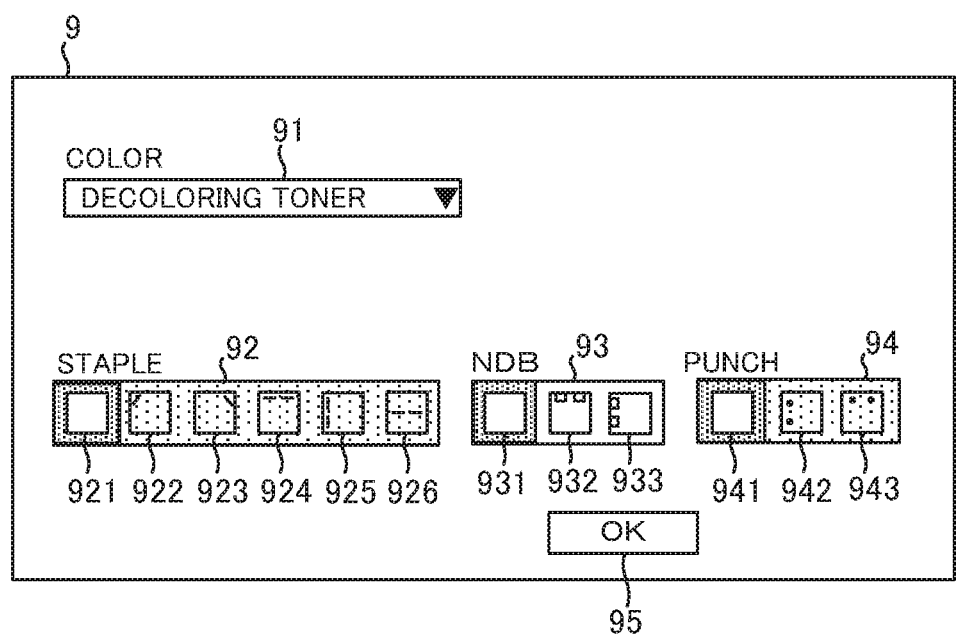
FIG. 15 is a view illustrating a setting screen when an NDB release is selected.

When receiving the choice of the button 811 (Act 43: YES), the terminal 3 releases the setting of the NDB processing and sets the decoloring toner mode (Act 44). In this case, as shown in FIG. 15, the release screen 81 disappears, and at the NDB processing setting column 93, the icon 931 has been selected to indicate that the NDB processing is not set.

As in Act 39, on the setting screen 9, the terminal 3 grays out the icons 922 to 926, 942, and 943, so as to disable the stapling processing and the punch processing, but only enables the NDB processing.

Figure 16:
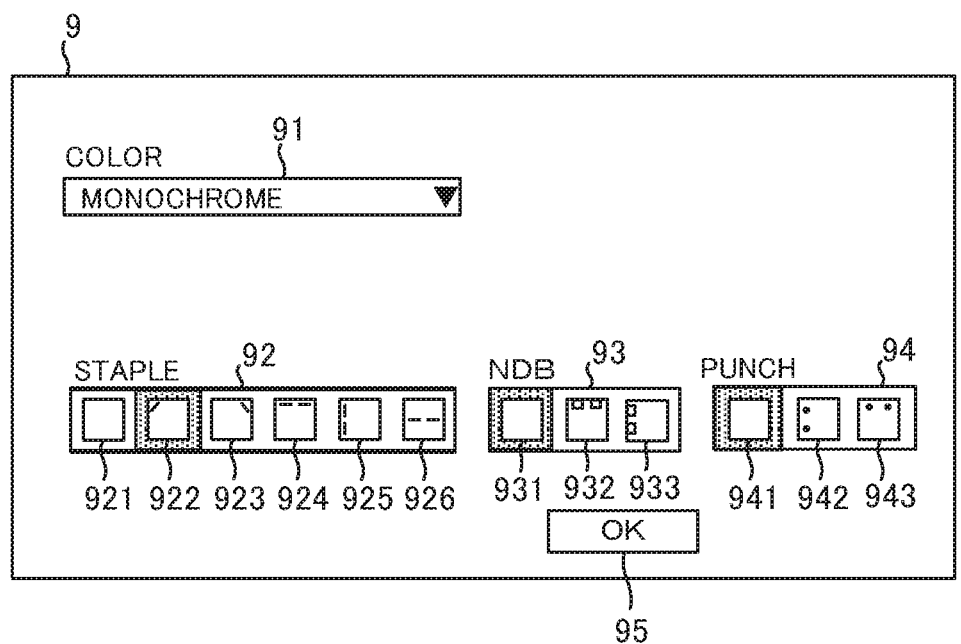
FIG. 16 is a view illustrating a setting screen when "Monochrome+Staple" is selected.

When receiving the choice of the button 812 (Act 43: NO), the terminal 3 releases the setting of the decoloring toner mode and the NDB processing, and sets the monochrome mode and the stapling processing (Act 45). As shown in FIG. 16, the release screen 81 disappears, and on the color setting column 91, the monochrome mode has been selected. On the NDB processing setting column 93, the icon 931 has been selected.

The setting of the stapling processing is set to the default setting for this case. On the stapling processing setting column 92, the icon 922 corresponding to the default setting has been selected.

Note that the terminal 3 may also forcedly release the setting of the NDB processing or set the monochrome mode and the stapling processing without allowing the operator to select the buttons 811 and 812.

If the number of pages is within a predetermined number (Act 41: YES), then the terminal 3 sets the decoloring toner mode, i.e., the color mode received from the operator, to maintain the setting of the NDB processing (Act 46). At this time, as in Act 39, on the setting screen 9, the terminal 3 grays out the icons 922 to 926, 942, and 943 to disable the setting of the stapling processing and the punch processing, but only enables the setting of the NDB processing.

In this embodiment, a description is given of the control of the print setting screen 9 displayed on a display 21 of the terminal 3. However, this processing is also applicable to the control of the setting screen 9 when the display 21 of the image forming apparatus 100 receives a copy job. In this case, when receiving a change from the monochrome mode to the decoloring toner mode while the NDB processing is set (Act 38: NDB, Act 40: NO), the terminal 3 sets the decoloring toner mode and maintains the setting of the NDB processing (Act 46).

The terminal 3 performs Act 39, and 44 to 46, and then Act 37.

Figure 17:
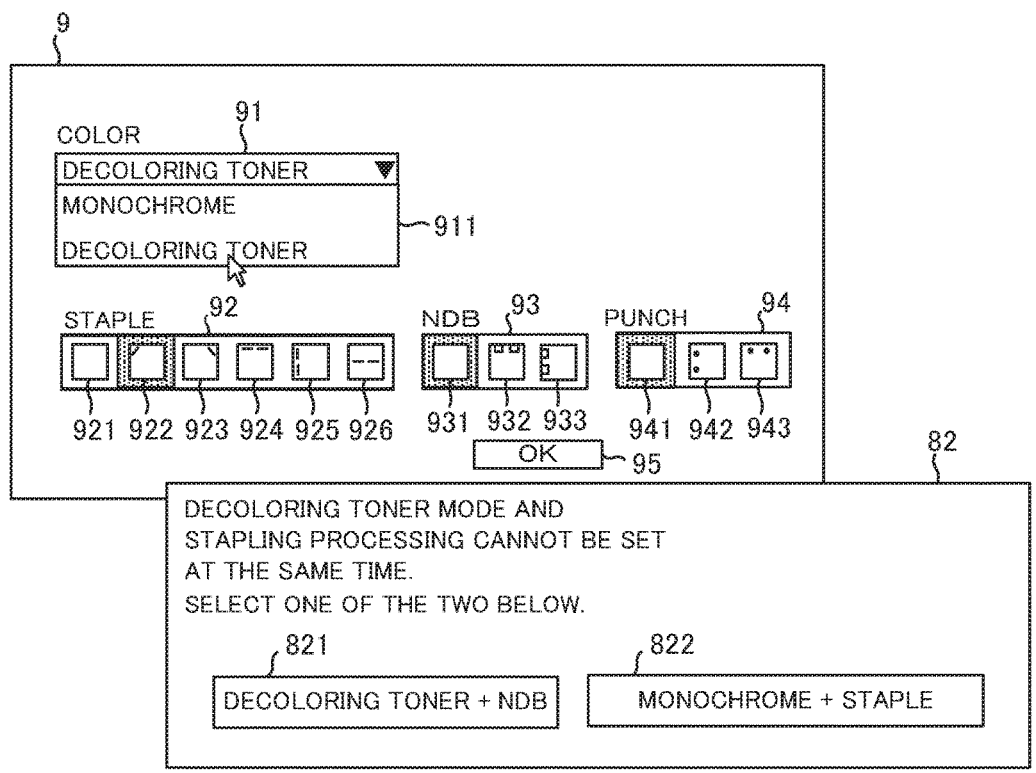
FIG. 17 is a view illustrating a release screen.

FIG. 17 is a view illustrating a release screen 82 (a first release screen).

When receiving a change to the decoloring toner mode while the stapling processing is set (Act 38: Punch or Staple, Act 47: YES), the terminal 3 displays the release screen 82 (Act 48). The release screen 82 displays a button 821 labeled "Decoloring toner+NDB" and a button 822 labeled "Monochrome+Staple," and the following sentence: "The decoloring toner mode and the stapling processing cannot be set at the same time. Select one of the two below."

When the stapling processing may be changed to the NDB processing to maintain the decoloring toner mode, the operator selects "Decoloring toner+NDB" button 821. In this case, the decoloring toner mode is maintained, and the post-processing setting is changed from the stapling processing to the NDB processing.

When the decoloring toner mode may be released because the binding processing is desired, the operator selects "Monochrome+Staple" button 822. In this case, the mode is changed to the monochrome mode, and the post-processing setting is maintained to the stapling processing.

Figure 18:
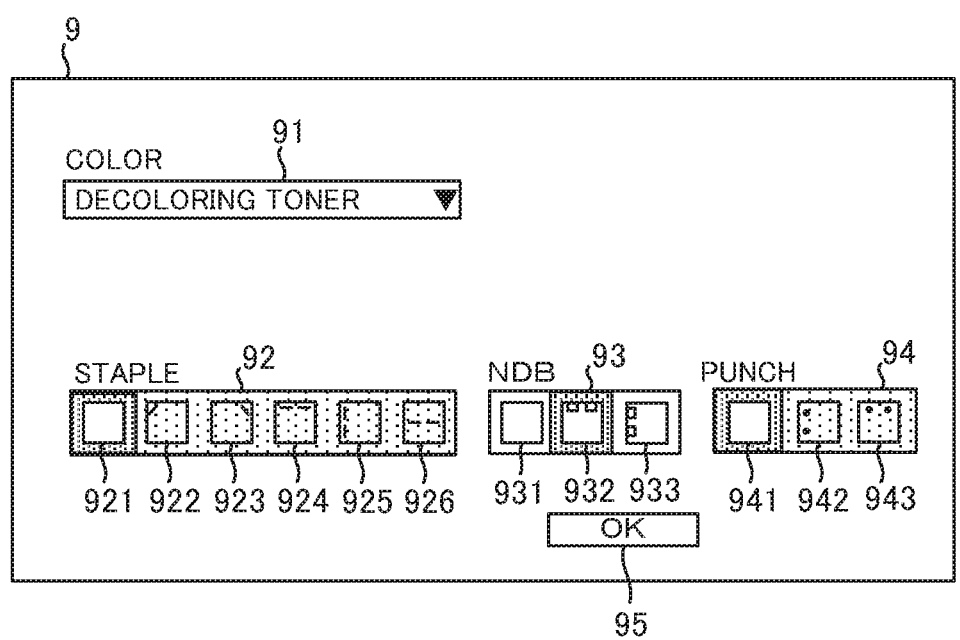
FIG. 18 is a view illustrating a setting screen when "Decoloring toner+NDB" is selected.

When receiving the choice of the button 821 (Act 49: YES), the terminal 3 changes the setting of the stapling processing to the NDB processing, and sets the decoloring toner mode (Act 50). As shown in FIG. 18, the release screen 82 disappears. In the stapling processing setting column 92, the icon 921 has been selected. The setting of the NDB processing is set to the default setting for this case. In the NDB processing setting column 93, the icon 932 corresponding to the default setting has been selected.

As in Act 39, the terminal 3 grays out the icons 922 to 926, 942, and 943, disables the setting of the stapling processing and the punch processing, and only enables the setting of the NDB processing.

Figure 19:
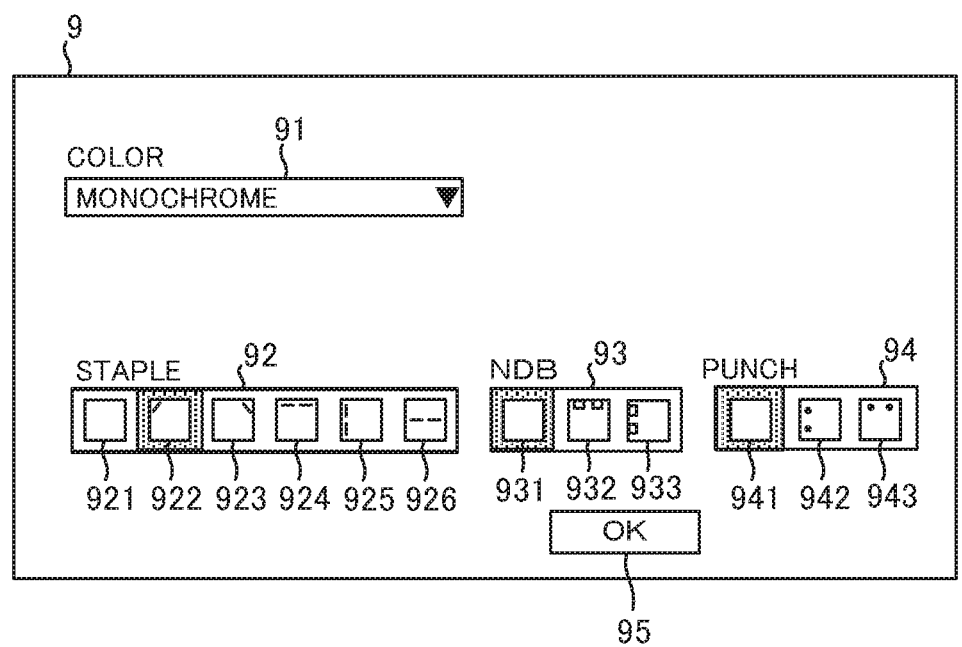
FIG. 19 is a view illustrating a setting screen when "Monochrome+Staple" is selected.

When receiving the choice of the button 822 (Act 49: NO), the terminal 3 changes the setting of the decoloring toner mode to the monochrome mode (Act 51). As shown in FIG. 19, the release screen 82 disappears, and the monochrome has been selected in the color setting column 91.

Note that the terminal 3 may not allow the operator to make a choice, but may forcedly change the setting of the stapling processing to the NDB processing, or change the setting of the decoloring toner mode to the monochrome mode. Furthermore, the terminal 3 may also enable the reception of the processing just for releasing the stapling processing on the release screen 82.

Figure 20:
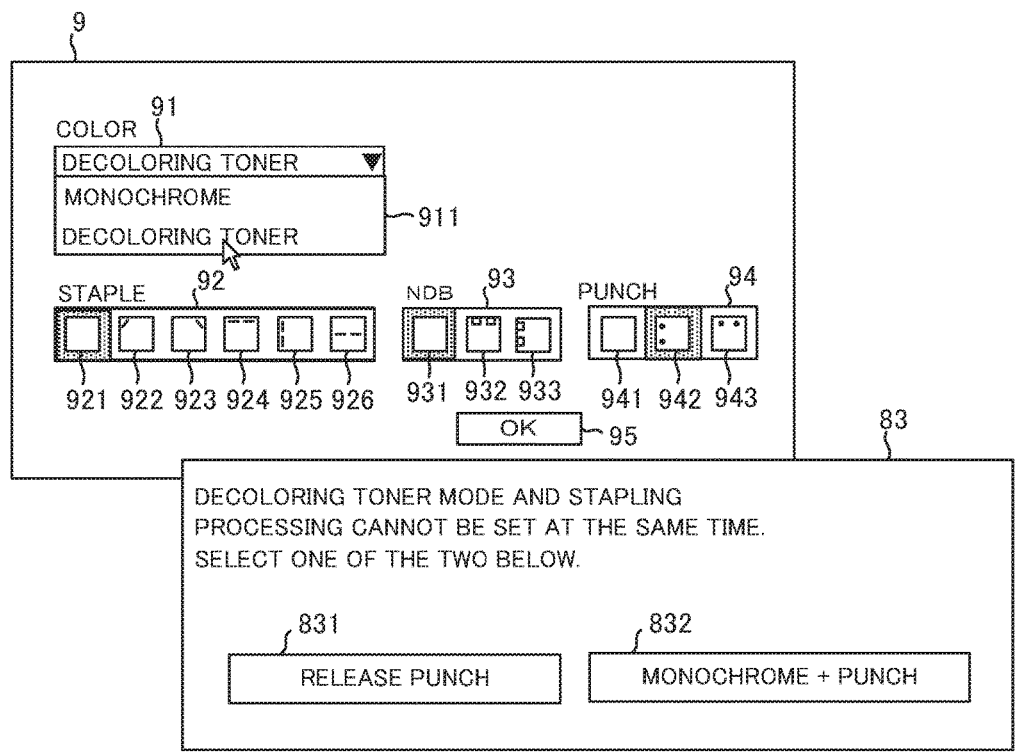
FIG. 20 is a view illustrating a release screen.

FIG. 20 is a view illustrating a release screen 83 (the first release screen).

When having received a change to the decoloring toner mode while the punch processing is set (Act 38: Punch or Staple, Act 47: NO), the terminal 3 displays the release screen 83 (Act 52). The release screen 83 displays a button 831 labeled "Release Punch," a button 832 labeled "Monochrome+Punch," and the following sentence: "The decoloring toner mode and the punch processing cannot be set at the same time. Select one of the two below."

When the punch processing may be released to maintain the decoloring toner mode, the operator selects the "Release Punch" button 831. In this case, the decoloring toner mode is maintained, and the setting of the punch processing is released.

When the decoloring toner mode may be released because the punch processing is desired, the operator selects the "Monochrome+Punch" button 832. In this case, the mode is changed to the monochrome mode, and the setting of the punch processing is maintained.

When receiving the choice of the button 831 (Act 53: YES), the terminal 3 releases the setting of the punch processing, and sets the decoloring toner mode (Act 54). Referring to FIG. 15, the terminal 3 turns off the release screen 83 and allows the icon 941 to be selected in the punch processing setting column 94. As in Act 39, the terminal 3 grays out the icons 922 to 926, 942, and 943, disables the setting of the stapling processing and the punch processing, and only enables the setting of the NDB processing.

Figure 21:
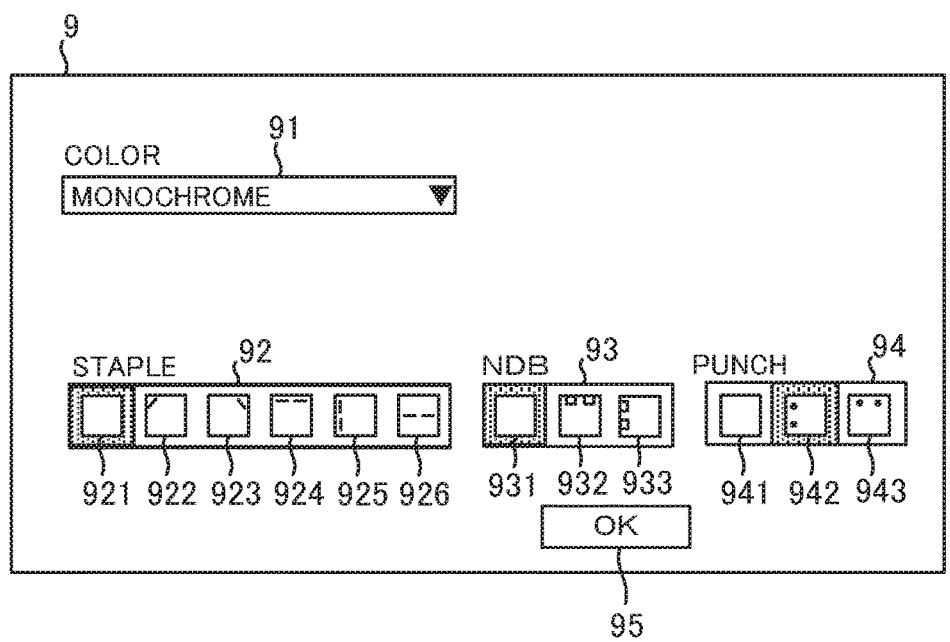
FIG. 21 is a view illustrating a setting screen when "Monochrome+Punch" is selected.

When receiving the choice of the button 832 (Act 53: NO), the terminal 3 changes the setting of the decoloring toner mode to the monochrome mode (Act 55). As shown in FIG. 21, the release screen 83 disappears, and the monochrome has been selected in the color setting column 91.

Note that the terminal 3 may not allow the operator to make a choice, but may forcedly release the punch processing, or change the setting of the decoloring toner mode to the monochrome mode.

The terminal 3 performs the processing of Act 50, 51, 54, and 55, and then Act 37.

(Modification)

In the print job executed by the controller 20 (or the controller 28), pages on which the images are formed with the color material for removal and pages on which the images are formed with the color material for non-removal may be mixed. Even in this case, the conditions on which the controller 20 switches the first processing (for example, the stapling processing) to the NDB processing are that the automatic NDPP is set and that the first processing (for example, the stapling processing) is set as the setting of the post processing of the job.

The conditions in the first embodiment may be that the job is set to the automatic NDPP and the punch processing is set as the setting of the post processing of the job.

As stated above in detail, according to the technology described herein, to receive the setting of printing using a color material for removal, it is possible to provide a technique for receiving a setting suitable for reuse of an image receiving medium.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A control method for a setting screen which enables selection between a first mode to form an image using a color material for non-removal and a second mode to form an image using a color material for removal, the control method including:
    enabling, on the setting screen when the first mode is set, setting of a punching post-processing to make a hole on an image receiving medium and a non-damage binding processing to bind a plurality of image receiving media using a clip, the non-damage binding processing is a non-punching post-processing to make no hole on an image receiving medium, and
    disabling, on the setting screen when the second mode is set, the setting of the punching post-processing and enabling the setting of the non-damage binding processing.

2. The method according to claim 1, wherein
when a change from the first mode to the second mode is received on the setting screen while the punching post-processing is set, a punching post-processing release screen on which a release of the setting to perform the punching post-processing in the second mode is displayed.

3. The method according to claim 2, wherein
the punching post-processing includes a stapling processing of binding a plurality of image receiving media using a staple, and
when a change from the first mode to the second mode is received on the setting screen while the stapling processing is set, the method enables receiving, on the punching post-processing release screen, a change from the stapling processing to the non-damage binding processing.

4. The method according to claim 3, wherein
on the punching post-processing release screen, the method enables receiving a change from the stapling processing to the non-damage binding processing and a change from the second mode to the first mode.

5. The method according to claim 1, wherein
the punching post-processing includes a stapling processing of binding a plurality of image receiving media using a staple, and
when a change from the first mode to the second mode is received on the setting screen, the setting screen performs a setting of a print job, and when the non-damage binding processing is set and when a number of prints is greater than a predetermined number, a non-damage binding processing release screen to receive a release of the setting to perform the non-damage binding processing in the second mode is displayed.

6. The method according to claim 5, wherein
the non-damage binding processing release screen enables receiving of a release of the non-damage binding processing and a change to the first mode and the stapling processing.

7. The method according to claim 1, wherein
the punching post-processing includes a stapling processing of binding a plurality of image receiving media using a staple, and
when a change from the first mode to the second mode is received on the setting screen, the setting screen performs a setting of a copy job, and when the non-damage binding processing is set, the second mode and the non-damage binding processing are set.

8. The method according to claim 2, wherein
the punching post-processing includes a punch processing of punching an image receiving medium to make a hole on the image receiving medium, and
when a change from the first mode to the second mode is received on the setting screen while the punch processing is set, the punching post-processing release screen enables receiving of the release of the punch processing and the change to the first mode.

9. The method according to claim 1, wherein
the punching post-processing includes a stapling processing of binding a plurality of image receiving media using a staple.

10. The method according to claim 9, wherein
the punching post-processing further includes a punch processing of punching an image receiving medium to make a hole on the image receiving medium.

* * * * *